United States Patent [19]

Baillet

[11] Patent Number: 5,151,815
[45] Date of Patent: Sep. 29, 1992

[54] SCANNING DEVICE AND APPLICATION THEREOF TO ANALYSIS DEVICES

[75] Inventor: Gérard Baillet, St Benoit Vienne, France

[73] Assignee: SAT (Societe Anonyme de Telecommunications), Paris, France

[21] Appl. No.: 633,625

[22] Filed: Dec. 26, 1990

[30] Foreign Application Priority Data

Dec. 26, 1989 [FR] France ................ 89 17166

[51] Int. Cl.$^5$ ........................................... G02B 26/10
[52] U.S. Cl. ................................. 359/220; 359/196; 250/236
[58] Field of Search ............... 359/196, 211, 216, 217, 359/220; 250/235, 236, 234

[56] References Cited

U.S. PATENT DOCUMENTS

| | | |
|---|---|---|
| 3,360,659 | 12/1967 | Young . |
| 3,619,039 | 11/1971 | Beiser . |
| 3,866,038 | 2/1975 | Korth ................... 250/236 |
| 4,268,110 | 5/1981 | Ford ..................... 359/216 |
| 4,733,072 | 3/1988 | Lettington ............. 250/235 |
| 4,805,974 | 2/1989 | Brueggemann et al. ... 359/216 |
| 4,870,273 | 9/1989 | Brueggermann ......... 250/235 |
| 5,000,529 | 3/1991 | Katoh et al. ........... 359/216 |

FOREIGN PATENT DOCUMENTS 0040973 12/1981 European Pat. Off. .

Primary Examiner—Loha Ben
Attorney, Agent, or Firm—Lowe, Price, Le Blanc & Becker

[57] ABSTRACT

The present invention relates to scanning devices, for example those used in image scanning, observation and watching systems or else those used for example in aerial reconnaissance. The invention consists essentially in causing the mirror M to rotate about an axis distinct from the perpendicular to the plane of the rotating beam. In particular, this axis of rotation is set to an angle with respect to the perpendicular to the plane of the rotating beam, this angle being itself a function of the angle of incidence of the light beam.

25 Claims, 5 Drawing Sheets

SCANNING DEVICE AND APPLICATION THEREOF TO ANALYSIS DEVICES

BACKGROUND OF THE INVENTION

1. Field of the invention

The present invention relates to scanning devices, for example those used in image analysis, observation or watching systems, or else used for example in aerial reconnaissance. These scanning devices, comprising for example a mirror, scan a field of view about an axis of displacement and send the image of this field back to a detector device via focussing means.

Such scanning devices find an application in any optical deviation measurement, direction finding, range finding system or else any infrared, visible or ultraviolet metrology device.

More particularly, such a scanning device finds an application in line scanners.

A scanner usually comprises a mirror with several faces reflecting an incident light beam scanning the landscape, this mirror being controlled by such scanning devices, the reflected beam being then received by means of a strip or small mosaic of detectors.

To provide a high performance scanner, three essential requirements must be combined:
to have a wide angle scanning system,
to increase the number of faces of the rotary mirror or prism,
to reduce the diameter of the prism for a given dimension of the pupil.

In order to obtain the maximum number of lines scanned per unit of time and for each detection element, for a minimum power driving the reflecting prism, the scanning angle of the incident scanning beam as well as its speed must be increased.

2. Description of the Prior Art

Known scanning devices may for example be of the type shown in FIG. 1 or in FIG. 2

In the example of FIG. 1, the reflected or output beam rotates after reflection on the mirror. The axis of rotation of the mirror merges with axis A. The reflected beam then rotates at the same speed as the rotating mirror, the incident fixed ray being outside the plane in which the beam rotates.

In the example of FIG. 2, the mirror rotates about an axis perpendicular to the plane of the sheet and the reflected beam rotates twice as fast as the rotating mirror; the fixed ray $R_f$ is in the plane where the beam rotates.

These known systems each have advantages:
For system 1, it allows wide angles of rotation of the beam rotating about axis A.
For system 2, the maximum angle of deviation of the rotating beam is limited to $(360° \times 2)/N$ where N is the number of faces of the multi-face mirror, i.e. twice that of system 1.

However, these known systems have great drawbacks which the present invention strives to overcome.

In the first case, the maximum angle of deviation is appreciably less than $360°/N$.

In the second case, the fixed ray being in the plane of the rotating beam, the faces of the mirror must be large so as to avoid vignetting and keep a constant oblique pupil.

SUMMARY OF THE INVENTION

The object of the present invention is to provide an ideal system, i.e. comprising the advantages of the above two systems and, in particular, in which the beam rotates faster than the prism and in which the fixed ray is outside the scanning plane.

The means for reflecting the light beam may be a simple mirror, a reflecting polygon, a prism or any device capable of reflecting the incident light beam towards a receiver made for example from a semi-conducting material.

Furthermore, the system of the invention aims at providing a scanning device in which the rotating beam remains substantially in the same plane $P_t$.

The system for scanning a light beam consisting in receiving an incident rotating beam $R_T$ at an incidence $\frac{1}{2}B_1$ on reflecting means M, these reflecting means M being movable about an axis R, the reflected beam $R_f$ being fixed in space, is such that the axis of rotation R of the reflecting means M forms an angle i with the perpendicular A to the scanning plane $P_t$ of the rotating incident beam $R_T$.

The scanning system of the invention is such that its axis of rotation R is included in the plane $P_f$ formed by the perpendicular A to plane $P_t$ and the fixed reflected beam $R_f$.

Furthermore, for each incidence $\frac{1}{2}B_1$ of the incident rotating beam $R_T$ on the reflecting means M, there corresponds an angle for which the reflected beam $R_f$ is fixed and is outside the scanning plane $P_t$ in which the rotating beam $R_T$ moves.

In particular, the angle i which the axis of rotation R of the reflecting means M forms with the direction A is written:

$$i = \frac{\pi}{2} - B_3 - \frac{1}{2} B_1$$

where $B_3$ is for example the solution of the following system of 6 equations with 6 unknowns:

$$\cos C_1 = \cos A_1 \cos B_1$$

$$\tan \alpha_1 = \frac{\tan A_1}{\sin B_1}$$

$$\cos A_2 \left[ \cos \frac{B_1}{2} \cos \frac{C_1}{2} \right] + \sin \frac{B_1}{2} \sin \frac{C_1}{2} \cos \alpha_1$$

$$\cos \gamma_2 \left[ \cos \frac{C_1}{2} - \cos A_2 \cos \frac{B_1}{2} \right] / \sin A_2 \sin \frac{B_1}{2}$$

$$\cos B_3 = \frac{\cos \gamma_2 + \cos \gamma_2 \cdot \cos \alpha_3}{\sin \alpha_3 \cdot \sin \gamma_2}$$

$$\cos \alpha_3 = (-\cos^2 \gamma_2) + \sin^2 \gamma_2 \cdot \cos A_2$$

In particular, the magnitude i is advantageously between 0 and 180 degrees whereas the magnitude $\frac{1}{2}B_1$ is advantageously between 0 and 180 degrees. In addition, the angle i increases continuously with $B_1$ in accordance with a relation substantially close to that shown in FIG. 5. Furthermore, the semi scanning angle $A_1$ of the rotating beam $R_T$ in the plane $P_t$ is advantageously between 0 and 180 degrees in accordance with the invention.

Still according to the invention, the reflecting means are a mirror or prism with N sides, each side being reflecting, or a regular truncated pyramid whose lateral faces are reflecting and form the same angle with the axis of rotation R, the two bases being formed of regular polygons. These reflecting means may further, in accordance with the invention, be a polyhedron defined by two plane polygons, the plane polygons being orthogonal to the axis of rotation R, the N lateral faces of the polyhedron being trapeziums inclined with respect to the axis of rotation R through an angle $\alpha_n$, each angle $\alpha_n$ being substantially different from the angles $\alpha_{n-1}$ and $\alpha_{n+1}$ by an infinitesimal amount.

According to another characteristic, the incident light beam is a coherent or incoherent ultraviolet, visible or infrared light beam.

According to another characteristic, for each pair ($A_1$, $B_1$), $A_1$ being the semi scanning angle of the rotating beam and $\frac{1}{2}B_1$ the angle of incidence of the rotating beam $R_T$ on the reflecting means, there corresponds an optimum magnitude for which the rotating beam scans the fastest in its plane $P_t$ during rotation of the reflecting means.

The scanning device of the invention comprises the scanning means of the invention, these scanning means receiving the rotating beam RT at a fixed incidence $\frac{1}{2}B_1$, photodetector reception means 6 and an electronic circuit 7 for reading the signal received by the reception means 6, a drive device 2 causing rotation of the reflecting means 1 about axis R, means 8, 9 for coding this rotation and reading, delivering to the electronic reading circuit information about the state of the rotation.

BRIEF DESCRIPTION OF THE DRAWINGS

Other advantages and characteristics will be clear from the following description.

DESCRIPTION OF THE PREFERRED EMBODIMENTS

Figure 3:
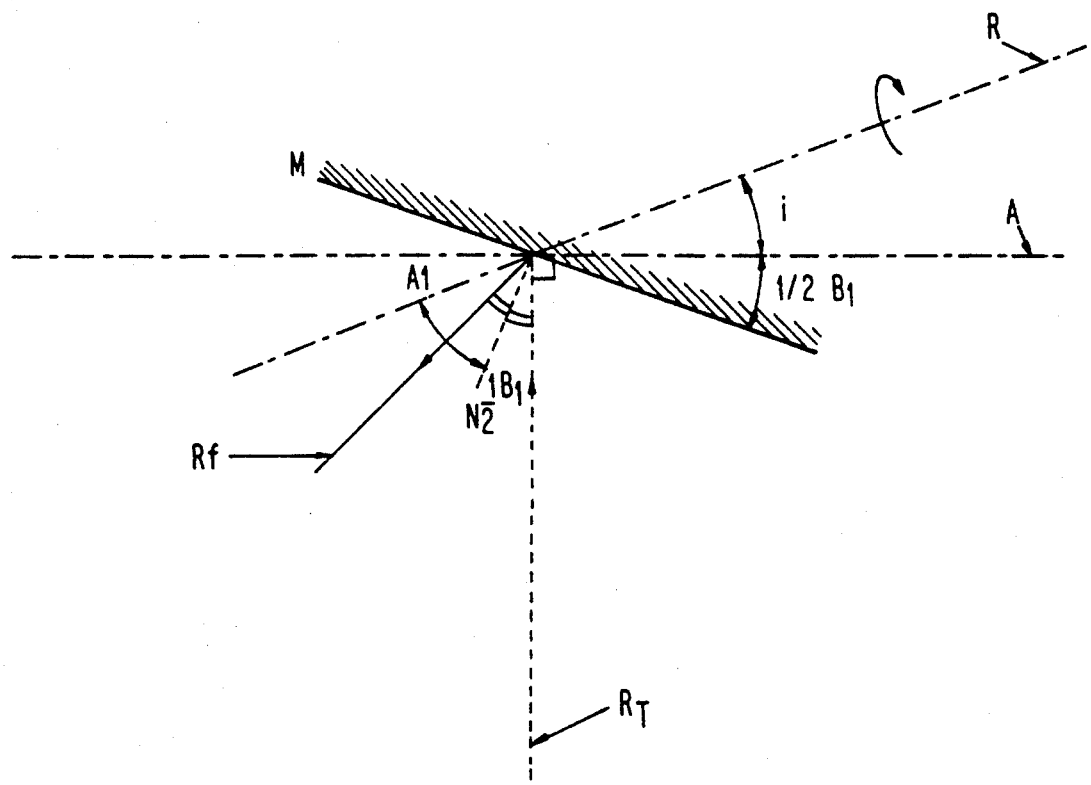
FIG. 3 shows the construction of the invention.

Referring to FIG. 3, the scanning device of the invention is essentially formed of a reflecting mirror M (or a prism), this mirror rotating about an axis of rotation R distinct from the perpendicular to the rotating beam $R_T$.

In fact, according to the invention an angle $\frac{1}{2}B_1$ is chosen of a suitable magnitude, $\frac{1}{2}B_1$ representing the angle between the normal to the mirror M and the fixed beam $R_f$ and still according to the invention i represents the angle between the perpendicular A to the rotating beam and the axis of rotation R of mirror M. This axis of rotation R is in the same plane as beam $R_f$ and as the direction A, this fixed beam $R_f$ itself forming an angle $\frac{1}{2}B_1$ with the normal N to the mirror M. Thus, when mirror M rotates about the axis R, the beam $R_T$ rotates substantially in the plane perpendicular to direction A. In fact, the maximum deviation of beam $R_T$ with respect to the plane perpendicular to direction A may remain less than 1/10 of a degree, which is very reasonable for deviations typically of ±50°.

Furthermore, the output beam $R_T$ rotates with mirror M but x times faster, x being related to the angle of rotation of the rotating beam $R_T$ as will be clear hereafter.

The following calculations allow the magnitudes $B_1$,i, to be verified, for which the rotating beam $R_T$ moves in a plane substantially perpendicular to direction A and this for quite satisfactory angles of rotation $A_1$ of the rotating beam $R_T$.

Figure 4:
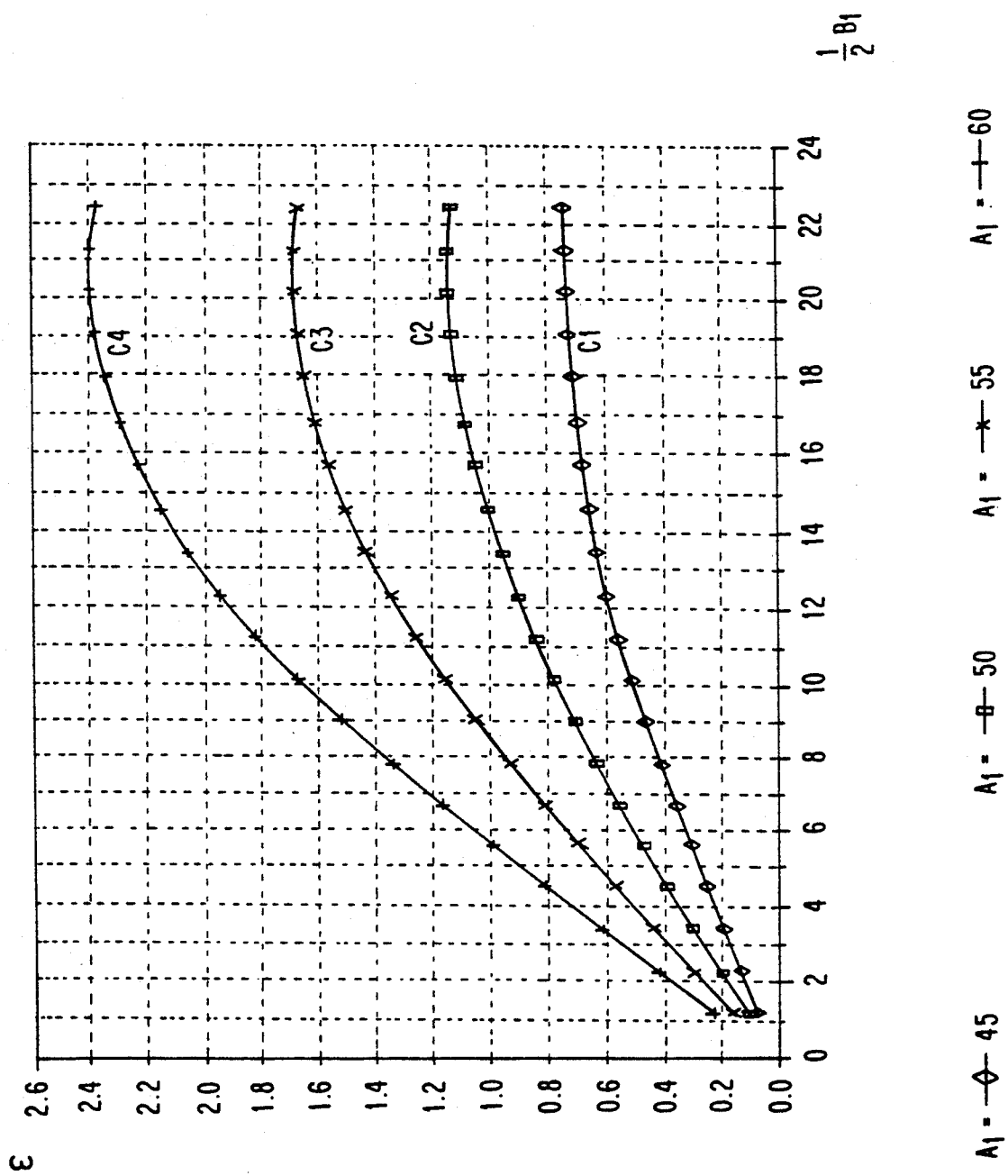
FIG. 4 illustrates the variation of deviation $\epsilon$ which the beam $R_T$ makes with the plane $P_t$ perpendicular to direction A as a function of $\frac{1}{2}B_1$, the angle of incidence of the light beam according to the invention.

FIG. 4 illustrates the deviation in milliradians which the rotating beam $R_T$ makes with the plane perpendicular to direction A as a function of the angle of incidence $\frac{1}{2}B_1$ to the light beam. It can be seen in this FIG. 4 that this deviation $\epsilon$ is certainly variable depending on whether the desired rotation for this rotating beam is more or less large. Four curves are plotted for four values of the desired rotation for the rotating beam $R_T$, each value $A_1$ representing the field semi angle in degrees:

$A_1 = +45°$, $A_1 = +50°$, $A_1 = +55°$, and finally
$A_1 = +60°$

For the value $A_1 = +45°$, the maximum deviation $\epsilon$ of the rotating beam with respect to the plane perpendicular to direction A remains very much reduced. It increases as a function of the angle of incidence $\frac{1}{2}B_1$. The curve $C_1$ represents this increase when $\frac{1}{2}B_1$ varies between 1° and 22°. This deviation is close to 0.7 mrd around 22°.

Curve $C_2$ shows the same variation of the maximum angle of deviation $\epsilon$ of the rotating beam $R_T$ with respect to the perpendicular to A when this rotating beam effects a rotation of ±50° in this plane perpendicular to A. It can be seen that the deviation $\epsilon$ is slightly greater but remains less than 2.2 mrd for the range of variation of the angle of incidence $\frac{1}{2}B_1$.

Curves $C_3$ and $C_4$ represent respectively deviations $\epsilon$ under the same conditions [$B_1/2\epsilon(1°,27°)$] but for semi angles of rotation $A_1$ of the rotating beam $R_T$ equal respectively to 55° and 60°.

When the scanning system does not require a wide rotation ($A_1$ less than 45°), the deviation $\epsilon$ is even better or else the rotating beam remains substantially in plane $P_t$ perpendicular to A.

Figure 5:
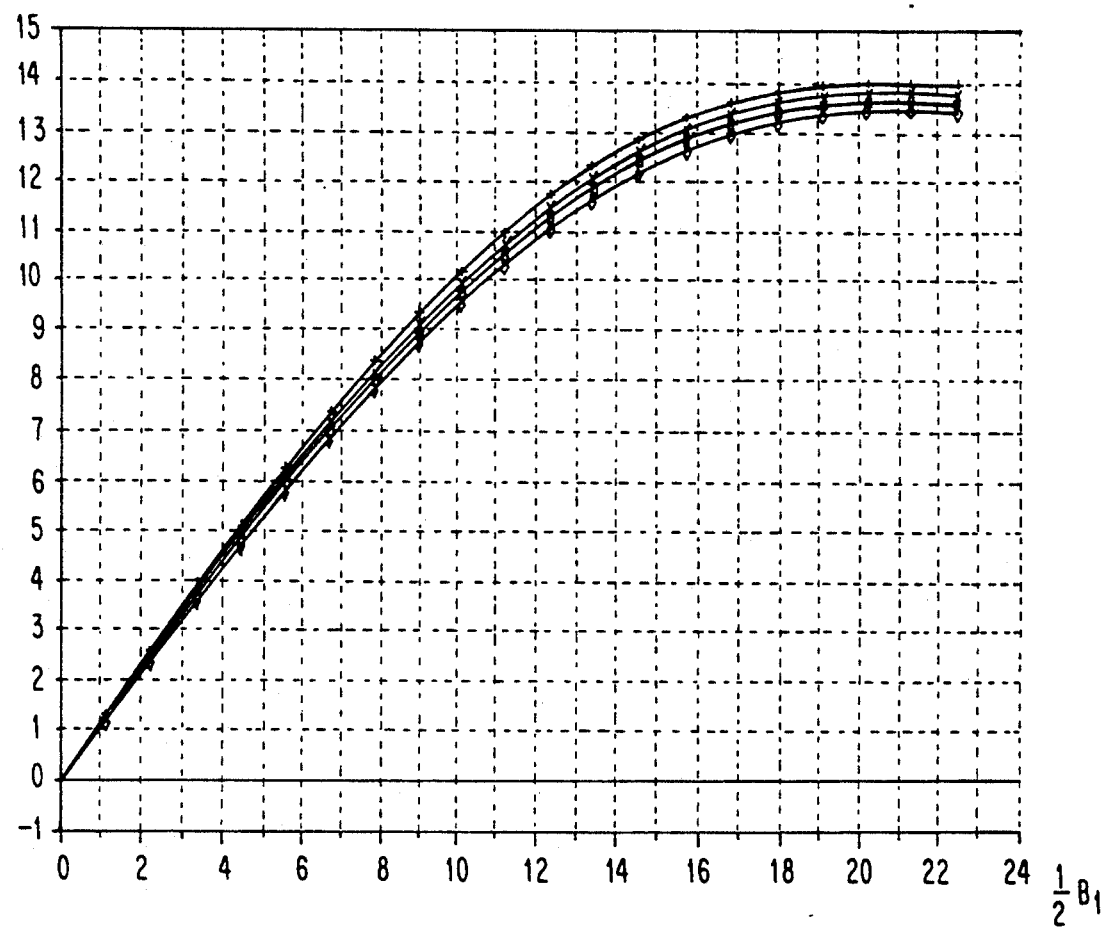
FIG. 5 shows the variation of i, the angle chosen for the axis of rotation R with respect to the direction A as a function of $B_1$.

FIG. 5 shows the variation of the angle i chosen for the axis of rotation R with respect to direction A. It can be seen that, when the angle of rotation $A_1$ of the rotating beam in the plane perpendicular to A varies from ±45° to ±60°, there is no appreciable difference for the value of i. However, the angle i varies from 1° to 14° when $\frac{1}{2}B_1$ varies from 1° to 22°.

Figure 1:
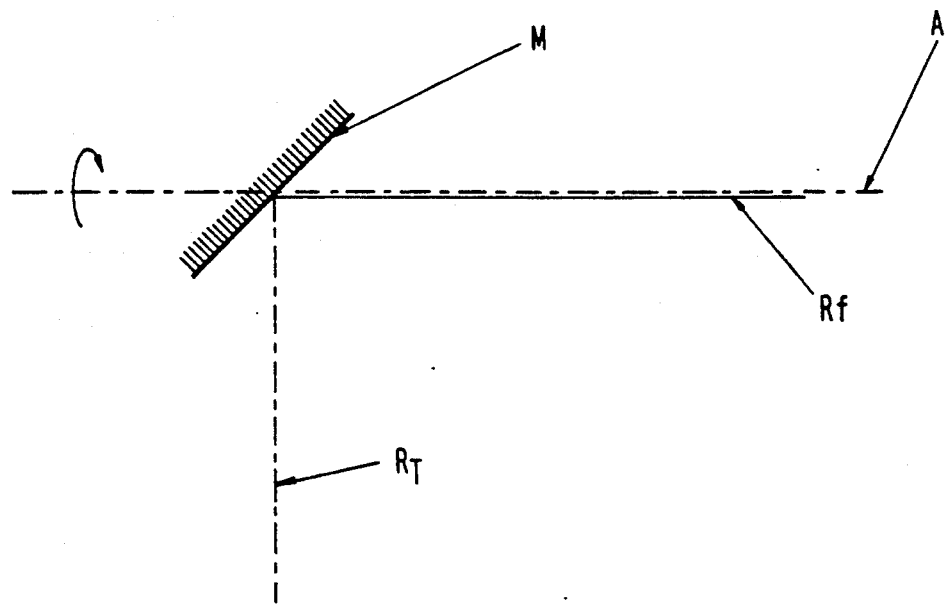
FIG. 1 is a diagram of the relative positions of the mirror M, of the incident light beam and of the axis of rotation A of mirror M according to the prior art.
Figure 2:
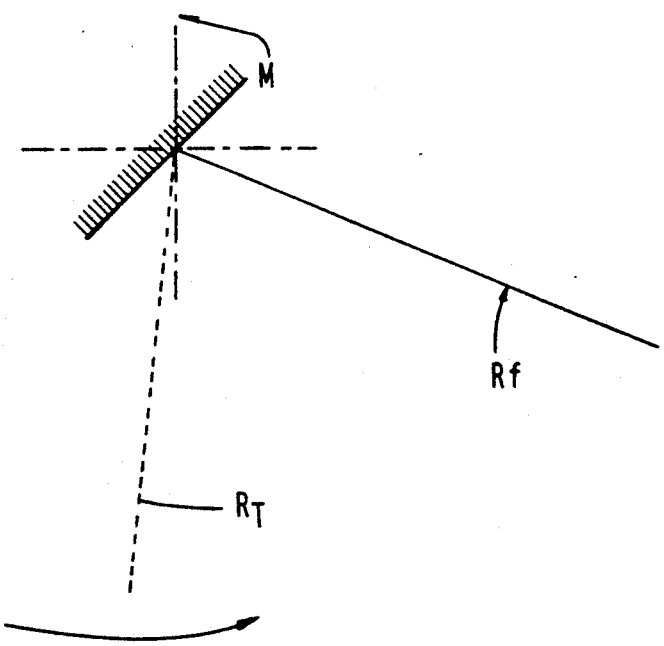
FIG. 2 shows a variant of the prior art in which the axis of rotation is in a plane perpendicular to the fixed beam as well as to the rotating beam.

For a desired semi scanning angle $A_1$ and for an angle of incidence $\frac{1}{2}B_1$ on the reflecting means M, there corresponds an optimum angle i for which the beam $R_T$ rotates the fastest with the rotation of each facet of the reflecting means. In fact, it is a prism with N faces, each face scans the field of $\pm A_1$ and initializes scanning at one end. For example, for a rotation of the rotating beam $R_T$ of $A_1$ equal to ±45° and for an incidence $\frac{1}{2}B_1$ of the rotating beam equal to 11.25 decimal degrees, we find an inclination i of the axis of rotation R' of the reflecting means M of 10.38 decimal degrees. The rotating beam then rotates 1.82 times faster than the reflecting means M, which is extremely close to the results of the second system (FIG. 2) of the prior art while having a fixed beam situated outside the scanning plane.

In fact, the multiplying coefficient is not exactly equal to 1.82 but varies from 1.8234 at the center to 1.8205 at the edge of the field, i.e. a non linearity of about 0.15% which is perfectly negligible. It can be seen that if the beam does not rotate exactly in the plane perpendicular to A, it only deviates therefrom by a negligible amount. Different methods allowing these magnitudes to be obtained will now be schematically developed below.

An inclination of axis R with respect to direction A with a value of the angle of incidence $\frac{1}{2}B_1$ is sought so as to minimize the angle between the rotating beam $R_T$ and the plane perpendicular to this direction A. This error may be expressed in different ways: by a peak to peak error, a mean quadratic error, a mean error, etc. . . .

The following calculation minimizes the peak to peak error in the field scanned by the rotating beam $R_T$. The choice of another type of error would give very closely related results.

To make the calculations, the field angle and the angle of incidence are fixed in the following way.

Let $A_1$ be the semi field angle of $R_T$ in the plane substantially perpendicular to the direction A.

Let $B_1$ be twice the angle of incidence of this same rotating beam $R_T$.

It is deduced therefrom that the inclination of axis of rotation R with respect to axis A is derived from $B_1$ by the relation:

$$i = \frac{\pi}{2} - B_3 - \frac{B_1}{2}$$

where $B_3$ is the solution of a system of 6 equations with 6 unknowns ($C_1, \alpha_1, A_2, \gamma_2, \alpha_3, B_3$):

$$\cos C_1 = \cos A_1 \cdot \cos B_1$$

$$\tan \alpha_1 = \frac{\tan A_1}{\sin B_1}$$

$$\cos A_2 = \left[\cos \frac{B_1}{2} \cdot \cos \frac{C_1}{2}\right] + \left[\sin \frac{B_1}{2} \cdot \sin \frac{C_1}{2} \cdot \cos \alpha_1\right]$$

$$\cos \gamma_2 = \frac{\cos \frac{C_1}{2} - \cos A_2 \cos \frac{B_1}{2}}{\sin A_2 \sin \frac{B_1}{2}}$$

$$\cos \alpha_3 = [-\cos^2 \gamma_2] + [\sin^2 \gamma_2 \cdot \cos A_2]$$

$$\cos B_3 = \frac{\cos \gamma_2 + \cos \gamma_2 \cos \alpha_3}{\sin \gamma_2 \cdot \sin \alpha_3}$$

where $\alpha_3$ is the semi angle of rotation of mirror M.

A program is used to solve this system of equations and deduce therefrom the angle of inclination i of the axis of rotation R with respect to axis A, angles $A_2$ and $B_1$ being predetermined (see program at the end of the description).

Figure 6:
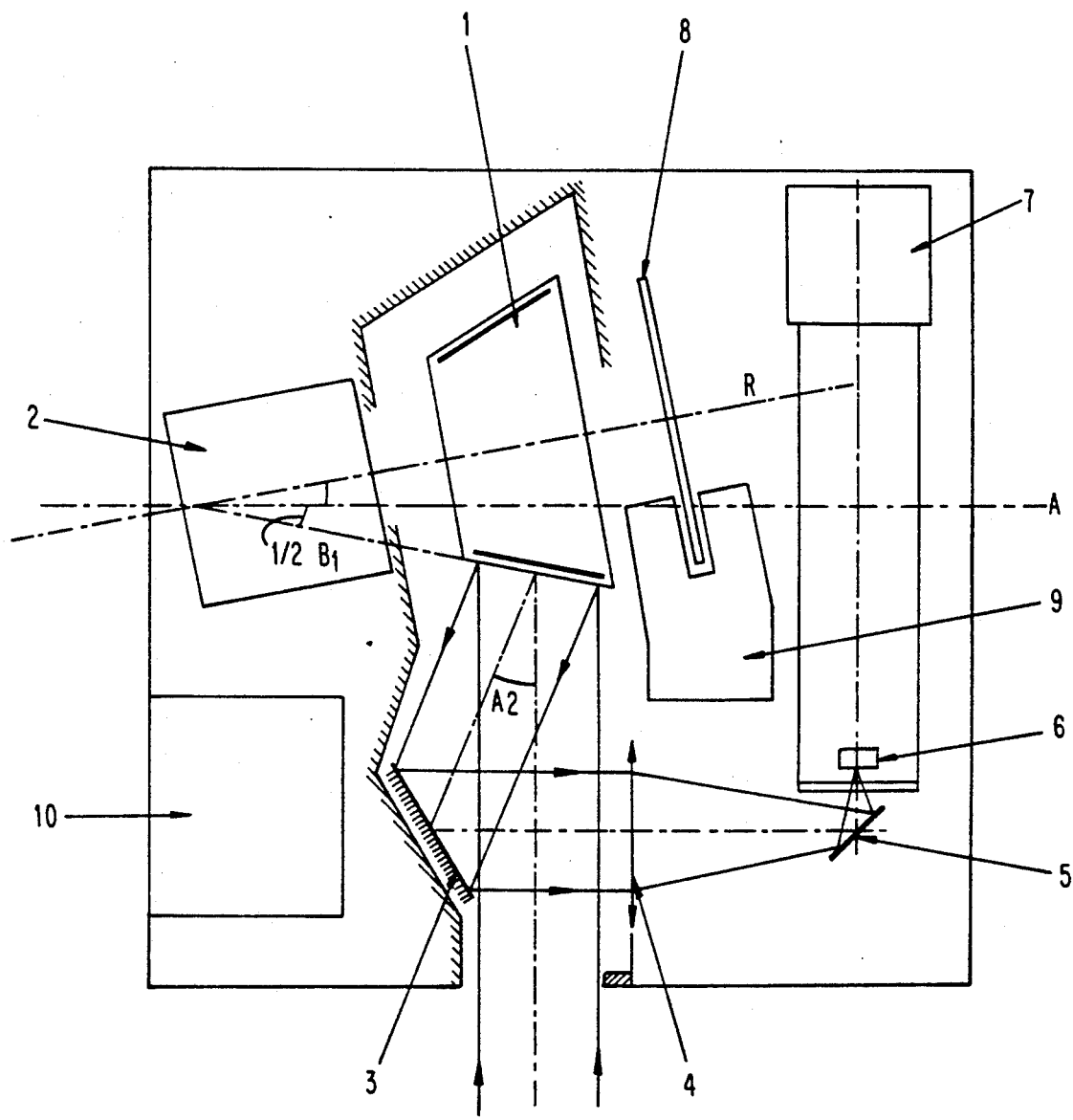
FIG. 6 shows a scanner construction in accordance with the invention.

FIG. 6 shows a scanner using a scanning device according to the present invention. The axis of rotation R of this reflecting rotating prism 1 is not perpendicular the plane of the rotating beam $R_T$ but on the contrary forms an angle i with the normal A to plane $P_t$ in which beam $R_f$ rotates, this axis R being also situated in the plane containing the axis A and the fixed beam $R_f$.

Motor 2 rotates prism 1 while the rotating beam $R_T$ is reflected by a lateral face of this prism 1, in a direction forming the angle $A_2$ with the direction of incidence. A mirror 3 intercepts this fixed reflected beam and sends it back to a focussing optical system 4. After a second reflection, for example by means of a mirror 5, the fixed reflected beam is received by a strip 6 formed of a plurality of photodetector elements. An electronic circuit 7 analyses the signals received by this strip 6 in synchronism with the information delivered by the disk 8 for coding and knowing the position of prism 1. A circuit 9 reading disk 8 delivers this information to the electronic circuit 7.

The fixed beam $R_f$ is outside the scanning plane. The rotating reflected prism 1 may comprise any number of faces (from 1 to N), N being as large as desired within the limits of the size of the system. In practice, as reflecting prism 1 a regular truncated pyramid may be used whose lateral faces are reflecting and form the same angle with the axis of rotation R and whose two bases are formed of regular polygons.

In another embodiment not shown, the reflecting means are a polyhedron defined by two plane polygons, said polygons being orthogonal to the axis of rotation R, N lateral faces of said polyhedron being trapeziums inclined with respect to the axis of rotation R by an angle $\alpha_n$, each angle $\alpha_n$ being substantially different from the angles $\alpha_{n-1}$ and $\alpha_{n+1}$ by a suitably chosen magnitude.

The number N of faces of the reflecting prism 1 is a compromise between numerous parameters, the main ones of which are the following:

the size, the desired scanning efficiency, the power of the available motor (the power $\Gamma$ consumed by a rotating device being proportional to power five of the diameter and to the cube of the speed of rotation $\Gamma::D^5\omega^3$), of the number of lines read per second.

For example, the scanning efficiency is close to 1 when the idle time is minimized. This will be the case for a high number of faces N.

Similarly, at a low speed, a small motor 2 may be sufficient. Now, the speed is inversely proportional to the number N of faces of prism 1.

Finally, a high number N of faces for this prism 1 results in a considerable size. Since a low rotation of the image is maintained in the focal plane of the optical system 4, a strip 6 may advantageously be used for reading the scanning signal for reading several lines simultaneously by means of a single rotation of the rotating beam. In practice, strip 6 may be formed of six detector elements. Thus, if the beam $R_T$ does not rotate exactly in the plane perpendicular to A, it only deviates therefrom by a negligible amount which introduces into the system errors which are not detectable or which can be readily corrected, for example, by inserting a correction device at the output of the reading of the information delivered by strip 6, for example by programming.

A scanning device according to the invention applies quite particularly to imagery particularly in the infrared, visible or ultraviolet fields for passive and also active systems.

The scanning device according to the invention applies to deviation measurement systems or more generally to metrology systems in the infrared, visible or ultraviolet fields for active and also passive systems.

The invention has the further advantage of reducing the volume occupied by the imagery device and increasing the scanning rate.

What is claimed is:

1. A system for scanning a light beam comprising: reflecting means M receiving a rotating incident beam $R_T$ at an angle of incidence $\frac{1}{2}B_1$ to provide a reflected beam $R_f$, said reflecting means M being movable about an axis of rotation R, the reflected beam $R_f$ being fixed in space, in which system the axis of rotation R of said reflecting means M forms an angle i with a perpendicular A to a scanning plane $P_t$ of said rotating incident beam $R_T$.

2. The scanning system as claimed in claim 1, wherein the axis of rotation R is included in a plane formed by said perpendicular A and the reflected beam $R_f$.

3. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 2, and, in response, providing an output signal,
a drive device for rotating said reflecting means about the axis of rotation, and
means for detecting a position of said reflecting means and, in response, supplying said rotation position data signal to said electronic circuit.

4. The scanning system as claimed in claim 1, wherein, for each angle of incidence $\frac{1}{2}B_1$ of said incident rotating beam $R_T$ on said reflecting means M, there corresponds an angle for which the reflected beam $R_f$ is fixed and is outside the scanning plane $P_t$ in which said rotating beam $R_T$ moves.

5. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 4, and, in response, providing an output signal,
a drive device for rotating said reflecting means about the axis of rotation, and
means for detecting a position of said reflecting means and, in response, supplying said rotation position data signal to said electronic circuit.

6. The scanning system as claimed in claim 1, wherein the angle i which the axis of rotation R of said reflecting means M forms with the direction perpendicular to the scanning plane of the rotating incident beam is written:

$$i = \frac{\pi}{2} - B_3 - \frac{1}{2} B_1$$

where $B_3$ is the solution of the following system of 6 equations with 6 unknowns:

$$\cos C_1 = \cos A_1 \cos B_1$$

$$\tan \alpha_1 = \frac{\tan A_1}{\sin B_1}$$

$$\cos A_2 = \left[\cos \frac{B_1}{2} \cos \frac{C_1}{2}\right] + \left[\sin \frac{B_1}{2} \sin \frac{C_1}{2} \cos \alpha_1\right]$$

$$\cos \gamma_2 = \left[\cos \frac{C_1}{2} - \cos A_2 \cos \frac{B_1}{2}\right] / \sin A_2 \sin \frac{1}{2} B_1$$

$$\cos B_3 = \frac{\cos \gamma_2 + \cos \gamma_2 \cdot \cos \alpha_3}{\sin \alpha_3 \sin \gamma_2}$$

$$\cos \alpha_3 = (-\cos^2 \gamma_2) + \sin^2 \gamma_2 \cdot \cos A_2$$

7. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 6, and, in response, providing an output signal,
a drive device for rotating said reflecting means about the axis of rotation, and
means for detecting a position of said reflecting means and, in response, supplying said rotation position data signal to said electronic circuit.

8. The scanning system as claimed in claim 6, wherein the angle i is between 0 and 180 degrees whereas the magnitude $\frac{1}{2}B_1$ is between 0 and 180 degrees.

9. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 8, and, in response, providing an output signal,
a drive device for rotating said reflecting means about the axis of rotation, and
means for detecting a position of said reflecting means and, in response, supplying said rotation position data signal to said electronic circuit.

10. The scanning system as claimed in claim 1 wherein a semi scanning angle $A_1$ of said rotating beam $R_T$ in the plane $P_t$ is between 0 and 180 degrees.

11. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 10, and, in response, providing an output signal,
a drive device for rotating said reflecting means about the axis of rotation, and means for detecting a position of said reflecting means and, in response, supplying said rotation position data signal to said electronic circuit.

12. The scanning system as claimed in claim 1, wherein said reflecting means is a mirror.

13. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 12, and, in response, providing an output signal,
a drive device for rotating said reflecting means about the axis of rotation, and
means for detecting a position of said reflecting means and, in response, supplying said rotation position data signal to said electronic circuit.

14. The scanning system as claimed in claim 1, wherein said reflecting means is a prism with $N_1$ sides, each side being reflecting, and $N_1$ being greater than or equal to 1.

15. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 14, and, in response, providing an output signal,
a drive device for rotating said reflecting means about the axis of rotation, and
means for detecting a position of said reflecting means and, in response, supplying said rotation position data signal to said electronic circuit.

16. The scanning system as claimed in claim 1, wherein said reflecting means is a regular truncated pyramid having reflecting lateral faces and form the same angle with the axis of rotation R, the two bases being formed of regulator polygons.

17. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 16, and, in response, providing an output signal,
a drive device for rotating said reflecting means about the axis of rotation, and
means for detecting a position of said reflecting means and, in response, supplying said rotation position data signal to said electronic circuit.

18. The scanning system as claimed in claim 1, wherein said reflecting means is a polyhedron having $N_2$ lateral faces defined by two plane polygons, the plane polygons being orthogonal to the axis of rotation R, the $N_2$ lateral faces of said polyhedron being trapeziums inclined with respect to said axis of rotation R through an angle $\alpha_n$, each angle $\alpha_n$ being substantially different from the angles $\alpha_{n-1}$ and $\alpha_{n+1}$ by an infinitesimal amount.

19. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 18, and, in response, providing an output signal,
a drive device for rotating said reflecting means about the axis of rotation, and
means for detecting a position of said reflecting means and, in response, supplying said rotation position data signal to said electronic circuit.

20. The scanning system as claimed in claim 1, wherein the light beam is one of the following beams: a coherent or incoherent ultraviolet, visible or infrared light beam.

21. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 20, and, in response, providing an output signal,
a drive device for rotating said reflecting means about the axis of rotation, and
means for detecting a position of said reflecting means and, in response, supplying said rotation position data signal to said electronic circuit.

22. The scanning system as claimed in claim 1, wherein, for each pair ($A_1$, $B_1$), $A_1$ being a semi scanning angle of the rotating beam and $\frac{1}{2}B_1$ the angle of incidence of the rotating beam $R_T$ on said reflecting means, there corresponds an optimum magnitude for which the rotating beam scans the fastest in its plane $P_t$ during rotation of said reflecting means.

23. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 22, and, in response, providing an output signal,
a drive device for rotating said reflecting means about the axis of rotation, and
means for detecting a position of said reflecting means and, in response, supplying said rotation position data signal to said electronic circuit.

24. A scanning device comprising:
scanning means receiving an incident rotating beam $R_T$, said scanning means reflecting said rotating beam $R_T$ at a fixed angle of incidence $\frac{1}{2}B_1$,
photodetector reception means,
an electronic circuit receiving a signal and a rotational position data signal from said reception means, wherein said scanning means are those claimed in claim 1, and, in response, providing an output signal,
a drive device for rotating said reflecting means about the axis of rotation, and means for detecting a position of said reflecting means and, in response, supplying said rotation position data signal to said electronic circuit.

25. The scanning system as claimed in claim 1, further comprising:

photodetector reception means receiving said reflected beam $R_f$ and, in response, providing a detector output signal;

drive means for rotating said reflecting means about said axis of rotation;

sensor means for detecting a rotation of said reflecting means and, in response, supplying a control signal; and output means receiving said detector output signal and said control signal for supplying a scanner output signal.

* * * * *